W. & D. HORSLEY.
METHOD OF MAKING FILMS FOR MOTION PICTURES.
APPLICATION FILED JUNE 5, 1911.
1,280,735. Patented Oct. 8, 1918.
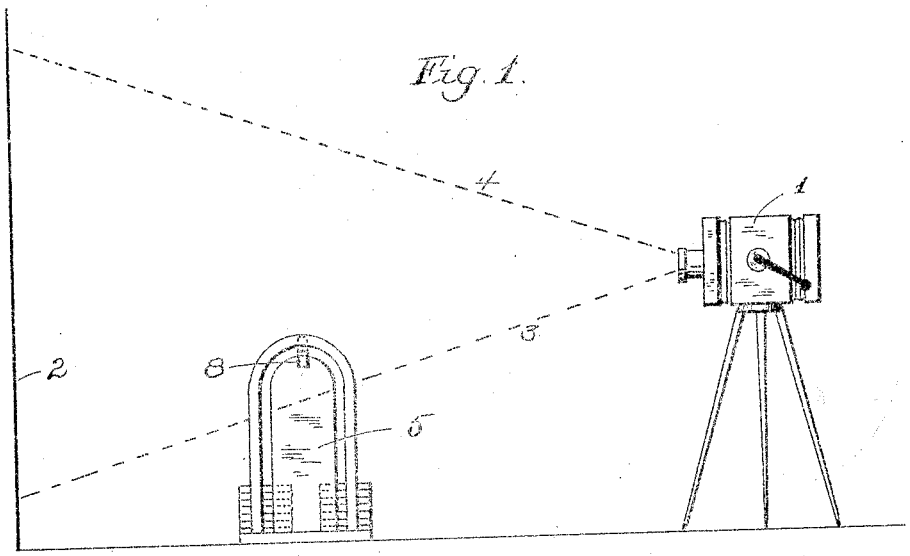
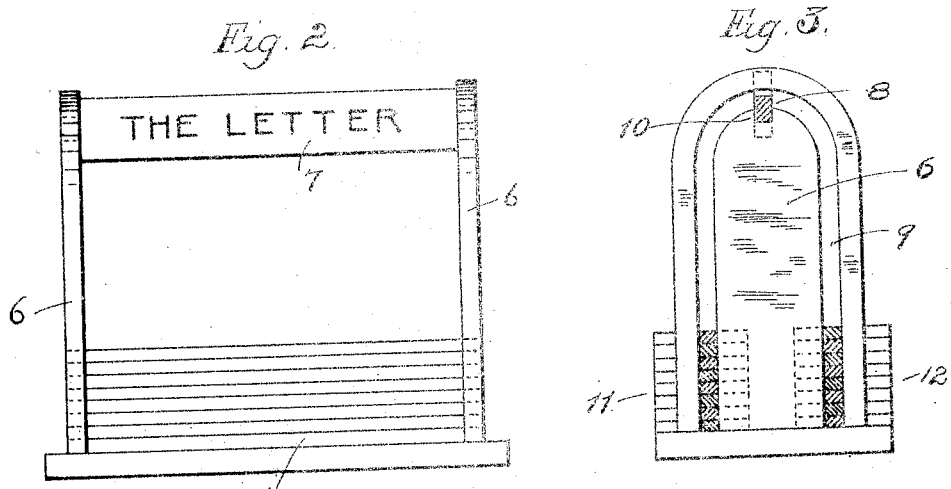

UNITED STATES PATENT OFFICE.

WILLIAM HORSLEY AND DAVID HORSLEY, OF BAYONNE, NEW JERSEY.

METHOD OF MAKING FILMS FOR MOTION-PICTURES.

1,280,735.   Specification of Letters Patent.   Patented Oct. 8, 1918.

Application filed June 5, 1911. Serial No. 631,311.

*To all whom it may concern:*

Be it known that we, WILLIAM HORSLEY and DAVID HORSLEY, both of the city of Bayonne, county of Hudson, and State of New Jersey, have invented new and useful Improvements in Methods of Making Films for Motion-Pictures, of which the following is a full, clear, and exact description, when taken in connection with the accompanying drawings, which form a part thereof.

Our invention relates to a method of making motion picture films, and its object is to provide means whereby legends appropriate to the successive scenes being photographed may be introduced into the pictures at points properly related to the successive images or scenes displayed.

Heretofore it has been customary to interpolate the legends between the several groups of exposures forming different scenes. This procedure has, however, the disadvantage that the projection of the legends delays the action of reproducing the pictures on the screen, and also, in most cases, prevents the observer from retaining a distinct impression of the words or legends, as the action denoted by the successive pictures proceeds. The object of the present invention is to avoid these disadvantages, and to provide a novel method of making motion picture films, whereby the words or legends may be readily incorporated directly in the pictures in such a manner that during the successive projection of a number of views the same legend will be directly associated with said views, preferably along one margin thereof. Then, as a change of scene takes place, a different legend will be projected in association with a number of views, and so on. Hence, the observer is very considerably assisted in appreciating the full significance of any particular scene or scenes.

To attain these and other ends, our invention consists of the method hereinafter described.

In the accompanying drawings Figure 1 represents a diagrammatic side view of a general combination of instrumentalities that may be used in practising our invention.

Fig. 2 a front enlarged view of the legend displaying apparatus;

Fig. 3 a transverse vertical section of Fig. 2; and

Fig. 4 a detail view of the legend-displaying board.

In all figures similar letters of reference designate like parts.

In the drawings, 1 is the camera which is supplied, as usual, with a sensitized film for taking pictures and with a crank handle for advancing the film.

The scene to be photographed is indicated by 2. Lines 3 and 4 indicate rays passing to the lens. Within a focal plane and near the edge of the plane of the picture is mounted a legend-displaying apparatus 5, having supports 6 on which may be mounted in the focal plane a legend-carrying board or device 7, bearing any words or legends desired to be introduced into the picture. With the size of camera usually employed for this work and in which the camera lens is about four feet above the ground plane, the legend-display apparatus should preferably be about twelve feet from the camera toward the object to be photographed, and about twenty inches above the ground plane.

In carrying out the method the words or legends to be introduced are first printed or otherwise represented on a legend-bearing board of suitable material, and then mounted in the display apparatus which is placed at such a certain calculable measured distance from the camera that the legend when photographed will appear at the edge of the photograph, and preferably at the base line of the separate pictures on the film. The camera is then operated, thus driving the sensitized film so as to take a series of pictures in the usual manner, and at the same time the legends are brought successively into line with the foci of the camera lens, so as to present to the camera with the desired number of impressions of the scenes of objects being photographed, the corresponding words or legends, or parts of words or legends. By this method the legends, or component parts thereof, will be photographed at the base line, or in other convenient marginal space, of each separate picture photographed on the film, so long as desired. They may also be omitted from any picture or series of pictures of the film, if desired.

In order that the eye of the observer may receive and retain a distinct impression of the words or legends as they are reproduced on the screen, it is advisable that each word should be repeated several times on successive pictures. To effect this result, each display device carrying a word is held projected within the focal plane while a series of photographs are taken, whereby the same word will be photographed upon a number of successive pictures.

Upon displaying the pictures on a suitable screen, the accompanying words or legends will also appear thereon arranged in proper order and in proper relation to the pictures shown or the action represented.

It is clear that various forms of apparatus may be employed for carrying and successively displaying within the focusing action of the lens, the desired words or legends to be reproduced.

The drawings illustrate a simple form of apparatus that may be employed to practise the process. This apparatus is indicated in its entirety by the numeral 5, and comprises essentially a magazine for legend bearing devices or instrumentalities. The legend bearing devices are indicated at 7, 11 and 12, and in this instance consist of flat boards each with square extensions 8, that are adapted to run in vertical U shaped ways 9 in the magazine. At the top of each way 9 is a vertical slot 10 in which the extensions 8 will fit and lock each display device within the focal plane of the camera. The display devices may successively be raised and locked in the said vertical slots 10.

By this means where it is desired to introduce a legend into a picture, a display device is raised in the supports 6 until its extensions 8 will fit into the slots 10 and the device will be held stationary with the legend in the focal plane of the camera until the desired number of successive impressions have been made on the sensitized film. This display device may be removed and a new device 11 raised to take its place.

Having thus described our invention, what we claim is:—

1. The method of producing moving picture films of subjects and legendary matter appropriate to the subjects and any changing conditions thereof, consisting in photographing the subjects, introducing between the photographic means and the subjects a magazine for instrumentalities carrying legendary matters, and successively locking each of said instrumentalities in said magazine in the focal plane of the photographing means.

2. The method of producing moving picture films of animated subjects and legendary matter appropriate to the subjects and the changing conditions thereof, consisting in photographing the subjects; introducing between the photographic means and the subjects a magazine for instrumentalities bearing legendary matter appropriate to the changing situations of the animated subjects, so that the subjects and the legendary matter are simultaneously photographed, positioning and locking said instrumentalities one after the other in the magazine and locating the magazine in the space between the animated subject and the photographic means so as to give the legendary matter the proper position and prominence desired in the pictures produced.

3. The method of producing moving picture films of animated subjects and legendary matter appropriate to the subjects and the changing conditions thereof, which consists in photographing the animated subjects, introducing between the photographic means and the animated subjects a magazine for movable instrumentalities bearing legendary matter, positioning said instrumentalities in said magazine in consecutive order without the focal plane of the photographic means, positioning said instrumentalities one after the other in the said focal plane, and disposing of said instrumentalities in their regular order in superposed position without the said focal plane and in a different position relative to their first position.

In witness whereof, we have hereunto set our hands and seals, the 29th day of May, 1911.

WILLIAM HORSLEY.
DAVID HORSLEY.

Witnesses:
SAMUEL H. FISHER,
FREDERICK A. LOCKE.